US011047413B2

(12) United States Patent
Harvey et al.

(10) Patent No.: US 11,047,413 B2
(45) Date of Patent: Jun. 29, 2021

(54) THREADED AND COUPLED TUBULAR GOODS CONNECTION

(71) Applicant: Hydril Company, Houston, TX (US)

(72) Inventors: Stephen Harvey, Houston, TX (US); Nestor Santi, Buenos Aires (AR); Matias Castilla, Buenos Aires (AR)

(73) Assignee: Hydril Company, Houston, TX (US)

( * ) Notice: Subject to any disclaimer, the term of this patent is extended or adjusted under 35 U.S.C. 154(b) by 847 days.

(21) Appl. No.: 15/486,048

(22) Filed: Apr. 12, 2017

(65) Prior Publication Data

US 2017/0314596 A1 Nov. 2, 2017

Related U.S. Application Data

(60) Provisional application No. 62/328,432, filed on Apr. 27, 2016.

(51) Int. Cl.
*F16B 7/04* (2006.01)
*E21B 17/042* (2006.01)
*F16B 7/18* (2006.01)

(52) U.S. Cl.
CPC .......... *F16B 7/0433* (2013.01); *E21B 17/042* (2013.01); *F16B 7/18* (2013.01)

(58) Field of Classification Search
CPC .......... F16B 7/0433; F16B 7/18; E21B 17/08; E21B 17/042; F16L 15/004; F16L 15/009
See application file for complete search history.

(56) References Cited

U.S. PATENT DOCUMENTS

| 3,854,760 A | 12/1974 | Duret |
| RE30,647 E | 6/1981 | Blose |
| 4,373,750 A | 2/1983 | Mantelle et al. |

(Continued)

FOREIGN PATENT DOCUMENTS

| DE | 4345119 | 5/1995 |
| EP | 2028402 A1 | 2/2009 |

(Continued)

OTHER PUBLICATIONS

International Search Report and Written Opinion of the International Searching Authority issued in International Application No. PCT/US2017/029377 dated Jul. 25, 2017; 15 pages.

(Continued)

*Primary Examiner* — Jonathan P Masinick
(74) *Attorney, Agent, or Firm* — Fish & Richardson P.C.

(57) ABSTRACT

A tubular goods connection for releasably coupling tubular members includes: a coupling having a first internal wedge dove-tail thread formed within a longitudinal bore of the coupling and a second internal dove-tail wedge thread; a first tubular member having a first mating external vanishing dove-tail wedge thread extending from a first proximal pin end face; and a second tubular member substantially identical to the first tubular member; wherein when the first and second tubular members are made-up into the coupling using a predetermined recommended optimum torque, a distance D between the first pin end face and the second pin end face is in the range of 0 to 10 millimeters and when the distance D is equal to 0 there is contact between the first pin end face and a second pin end face of the second tubular good but there is no axial interference.

33 Claims, 3 Drawing Sheets

(56) References Cited

U.S. PATENT DOCUMENTS

| | | | |
|---|---|---|---|
| 4,485,511 A | 12/1984 | Uthanic | |
| 4,673,201 A | 6/1987 | Dearden et al. | |
| 4,703,954 A | 11/1987 | Ortloff et al. | |
| 4,762,344 A | 8/1988 | Perkins et al. | |
| RE34,467 E | 12/1993 | Reeves | |
| 5,338,074 A | 8/1994 | Barringer et al. | |
| 5,454,605 A | 10/1995 | Mott | |
| 5,462,315 A | 10/1995 | Klementich | |
| 5,769,466 A | 6/1998 | Noel et al. | |
| 5,782,503 A | 7/1998 | Noel et al. | |
| 5,906,399 A | 5/1999 | Noel | |
| 6,158,785 A | 12/2000 | Beaulier et al. | |
| 6,206,436 B1 | 3/2001 | Mallis | |
| 6,263,968 B1* | 7/2001 | Freeman | E21B 33/124 166/313 |
| 6,406,070 B1 | 6/2002 | DeLange et al. | |
| 6,817,633 B2 | 11/2004 | Brill et al. | |
| 6,893,057 B2 | 5/2005 | Evans | |
| 7,438,329 B2 | 10/2008 | DeLange et al. | |
| 7,475,917 B2 | 1/2009 | Sivley et al. | |
| 7,527,304 B2* | 5/2009 | Mallis | E21B 17/0423 285/333 |
| 7,690,696 B2 | 4/2010 | Mallis et al. | |
| 7,753,416 B2* | 7/2010 | Mazzaferro | E21B 17/08 285/333 |
| 7,828,337 B2 | 11/2010 | Reynolds, Jr. | |
| 7,850,211 B2 | 12/2010 | Reynolds et al. | |
| 7,988,205 B2 | 8/2011 | Mallis et al. | |
| 8,136,846 B2* | 3/2012 | Church | F16L 15/006 285/334 |
| 8,365,687 B2* | 2/2013 | Nordh | F16L 57/06 122/511 |
| 8,882,157 B2* | 11/2014 | Chelette | F16L 15/001 285/334 |
| 9,500,045 B2* | 11/2016 | Kuttel | E21B 17/07 |
| 2003/0102669 A1 | 6/2003 | Tsujimura et al. | |
| 2004/0118569 A1 | 6/2004 | Brill et al. | |
| 2006/0145477 A1 | 7/2006 | Reynolds | |
| 2006/0145480 A1 | 7/2006 | Mallis et al. | |
| 2006/0152000 A1 | 7/2006 | DeLange et al. | |
| 2006/0261595 A1 | 11/2006 | Verger et al. | |
| 2007/0132239 A1 | 6/2007 | Reynolds | |
| 2008/0054633 A1 | 3/2008 | Reynolds | |
| 2014/0203556 A1 | 7/2014 | Besse | |
| 2015/0061288 A1 | 3/2015 | Chelette et al. | |
| 2016/0186899 A1 | 6/2016 | Besse | |
| 2016/0208962 A1 | 7/2016 | Sugino et al. | |

FOREIGN PATENT DOCUMENTS

| | | |
|---|---|---|
| EP | 2028403 A1 | 2/2009 |
| EP | 2366075 B1 | 4/2013 |
| EP | 3514432 | 7/2019 |
| WO | WO2007149673 | 12/2007 |
| WO | WO2008116891 | 10/2008 |
| WO | WO2010069491 | 6/2010 |
| WO | WO2011060894 | 5/2011 |
| WO | WO2017024208 | 2/2017 |

OTHER PUBLICATIONS

International Preliminary Report on Patentability in International Application No. PCT/US2017/029377 dated Nov. 8, 2018, 11 pages.

* cited by examiner

THREADED AND COUPLED TUBULAR GOODS CONNECTION

CLAIM OF PRIORITY

This application claims priority U.S. Patent Application Ser. No. 62/328,432, filed on Apr. 27, 2016, the entire contents of which are hereby incorporated by reference.

TECHNICAL FIELD

The present disclosure relates to a threaded and coupled connection for tubular goods, more particularly a made-up tubular goods connection for coupling a first and second tubular member using an internally threaded coupling.

SUMMARY

In a first aspect, a made-up tubular goods connection for releasably coupling a first and a second tubular member is disclosed. The made-up tubular goods connection includes a coupling having: a first box end having a first box end face and a second box end having a second box end face; and a longitudinal coupling bore extending through the coupling from the first box end to the second box end. The coupling further includes a continuous first internal wedge thread formed within the longitudinal coupling bore of the coupling and extending from the first box end face to a mid-point of the longitudinal coupling bore and a continuous second internal wedge thread formed within the longitudinal coupling bore and extending from the second box end face to the mid-point of the longitudinal bore.

The made-up tubular goods coupling further includes: a first tubular member having a first distal pin end and a first proximal pin end; a first longitudinal member bore extending through the first tubular member from the first proximal pin end to the first distal pin end, said first proximal pin end terminating in a first proximal pin end face; and a continuous first mating external wedge thread formed on a first exterior surface of the first tubular member and extending from the first proximal pin end face to a predetermined first point on the first tubular member.

The tubular goods coupling further includes a second tubular member having: a second distal pin end and a second proximal pin end; a second longitudinal member bore extending through the second tubular member from the second proximal pin end to the second distal pin end, said second proximal pin end terminating in a second proximal pin end face; and a continuous second mating external wedge thread formed on a second exterior surface of the second tubular member and extending from the second proximal pin end face to a predetermined second point on the second tubular member.

In the tubular goods connection, when the first proximal pin end of the first tubular member has been made-up in the first box end of the coupling and the second proximal pin end of the second tubular member has been made up in the second box end of the coupling, each made-up connection having been done with a recommended optimum make-up torque, a member distance D between the first proximal pin end face and the second proximal pin end face is in a range of 0 to 10 millimeters, and when the distance D is equal to 0 millimeters there is contact between the first proximal pin end face and the second proximal pin end face but there is no axial interference.

In a second aspect the made-up tubular goods connection according to aspect 1, a wedge coefficient $W_C$ of the continuous first internal wedge thread, the continuous second internal wedge thread, the continuous first mating external wedge thread, and the continuous second mating external wedge thread is less than 2.0, and wherein $W_C$ is defined as a ratio of a first width ($W_1$) of a widest wedge thread divided by a second width ($W_2$) of a narrowest wedge thread.

In a third aspect, the made-up tubular goods connection according to aspect 2, the wedge coefficient $W_C$ is in a range 1.3-1.9.

In a fourth aspect according to any of the aspects 1 to 3, the made-up tubular goods connection is configured such that when an over-torque is applied to the made-up tubular goods connection during installation of the made-up tubular goods connection in a wellbore by rotation of a string comprised of a plurality of interconnected tubular goods connections, said over-torque results in an interference contact between the first proximal pin end face and the second proximal pin end face of the made-up tubular goods connection.

In a fifth aspect according to any of the aspects 1 to 4, the interference contact between the first proximal pin end face and the second proximal pin end face transmits axial load through the made-up tubular goods connection.

In a sixth aspect according to any of the aspects 1 to 5, the made-up tubular goods connection has an over-torque capacity in a range of 150%-250% of the optimum make-up torque.

In a seventh aspect according to anyone of the aspects 1 to 6, the continuous first and continuous second internal wedge thread disposed in the coupling, the continuous first mating external wedge thread disposed on the first tubular member, and the continuous second mating external wedge thread disposed on the second tubular member are a dovetail wedge thread.

In an eighth aspect according to anyone of the aspects 1 to 7, the continuous first mating external wedge thread disposed on the first tubular member and the continuous second mating external wedge thread disposed on the second tubular member are a vanishing wedge thread.

In a ninth aspect according to aspect 8, wherein the predetermined first point on the first tubular member is defined by a first vanishing point of the continuous first mating external wedge thread on the first exterior surface of the first tubular member, and the predetermined second point on the second tubular member is defined by a second vanishing point of the continuous second mating external wedge thread on the second exterior surface of the second tubular member.

In a tenth aspect according to aspect 9, wherein a first taper pitch diameter of the continuous first mating external wedge thread intersects a first outer diameter (OD) of the first tubular member at the first vanishing point, and a second taper pitch diameter of the continuous second mating external wedge thread intersects a second outer diameter (OD) of the second tubular member at the second vanishing point.

In an eleventh aspect according to any of the aspects 1 to 10, the continuous first mating external wedge thread of the first tubular member has been made up in the continuous first internal wedge thread of the coupling, and the continuous second mating external wedge thread of the second tubular member has been made up in the continuous second internal wedge thread of the coupling.

In a twelfth aspect according to any of the aspects 1 to 11, the recommended optimum make-up torque in the made-up tubular goods connection is created only by the continuous first mating external wedge thread interfering with the continuous first internal wedge thread and the continuous second mating external wedge thread interfering with the continuous second internal wedge thread.

In a thirteenth aspect according to any of the aspects 1 to 12, the tubular goods connection is free from any torque shoulders.

In a fourteenth aspect according to any of the aspects 1 to 13, the predetermined first point of the continuous first mating external wedge thread is located on the first tubular member between the first distal pin end and the first proximal pin end face, and the predetermined second point of the continuous second mating external wedge thread is located on the second tubular member between the second distal pin end and the second proximal pin end (in particular, the second proximal pin end face).

In a fifteenth aspect according to any of the aspects 1 to 14, when the first proximal pin end of the first tubular member has been made-up in the first box end of the coupling and the second proximal pin end of the second tubular member has been made up in the second box end of the coupling, each made-up connection having been done with the recommended optimum make-up torque, the member distance D between the first proximal pin end face and the second proximal pin end face is in the range of 1 to 10 millimeters.

In a sixteenth aspect a method of drilling a deviated wellbore having an upper vertical portion, a curved transition portion, and terminating in an horizontal portion, comprises: providing a made-up coupling according to any of the aspects 1 to 15; installing a string comprised of a plurality of interconnected tubular goods connections in a wellbore; applying an over-torque to at least one or more of the made-up tubular goods connections by rotation of the string to move the at least one or more tubular good connection through the wellbore, wherein the over-torque results in an interference contact between the first proximal pin end face and the second proximal pin end face of the at least one or more of the tubular goods connection.

In a seventeenth aspect according aspect 16, the over-torque is applied when the at least one or more made-up tubular goods connection is moved through the horizontal portion of the wellbore while being rotated.

In an eighteenth aspect according to aspect 17, the interference contact between the first proximal pin end face and the second proximal pin end face transmits axial load through the at least one or more tubular goods connection.

In some aspects, the made-up tubular goods connection is adapted to be initially made-up with the first proximal pin end of the first tubular member being made-up in the first box end of the coupling and the second proximal pin end of the second tubular member being made up in the second box end of the coupling, each being made up using a predetermined optimum make-up torque, resulting in a distance D inside the longitudinal coupling bore measured between the first proximal pin end face and the second proximal pin end face being in a range of 0 to 10 millimeters, and wherein if the distance D=0, there is a contact between the first proximal pin end face and the second proximal pin end face, but there is no axial load transmitted by said contact.

In some aspects, the method of releasably connecting tubular goods includes making-up the first proximal pin end of the first tubular member in the first box end of the coupling and the second proximal pin end of the second tubular member into the second box end of the coupling with a predetermined optimum torque, resulting in a distance D inside of the longitudinal coupling bore between the first proximal pin end face and the second proximal pin end face being in a range of 0 to 10 millimeters, and wherein if the distance D=0, there is a contact between the first proximal pin end face and the second proximal pin end face but there is no axial load transferred by said contact; installing a string comprised of a plurality of interconnected tubular goods connections in a wellbore; and rotating the string in the wellbore and thereby applying an over-torque to at least one or more of the made-up tubular goods connections in the string, said over-torque creating an interference contact between the first proximal pin end face and the second proximal pin end face, wherein D<0.

BRIEF DESCRIPTION OF DRAWINGS

The details of one or more embodiments are set forth in the accompanying drawings.

DETAILED DESCRIPTION

Certain terms are used herein as they would be conventionally understood in the tubular goods industry, particularly where threaded tubular goods are connected in a vertical position along their central axis 28 (see FIG. 1A) such as when making up a tubular goods string for lowering into a wellbore. Typically, in a male-female threaded tubular goods connection, the male component of the connection is referred to as a "pin end" member and the female component is called a "box" member or a "coupling".

Figure 1:
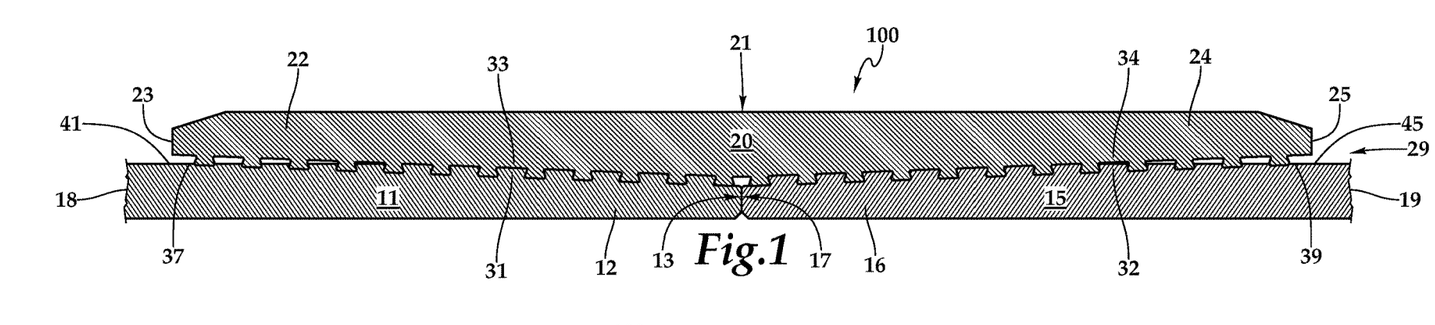
FIG. 1 is a cross section of a made-up tubular goods connection according to the present invention.
Figure 1A:
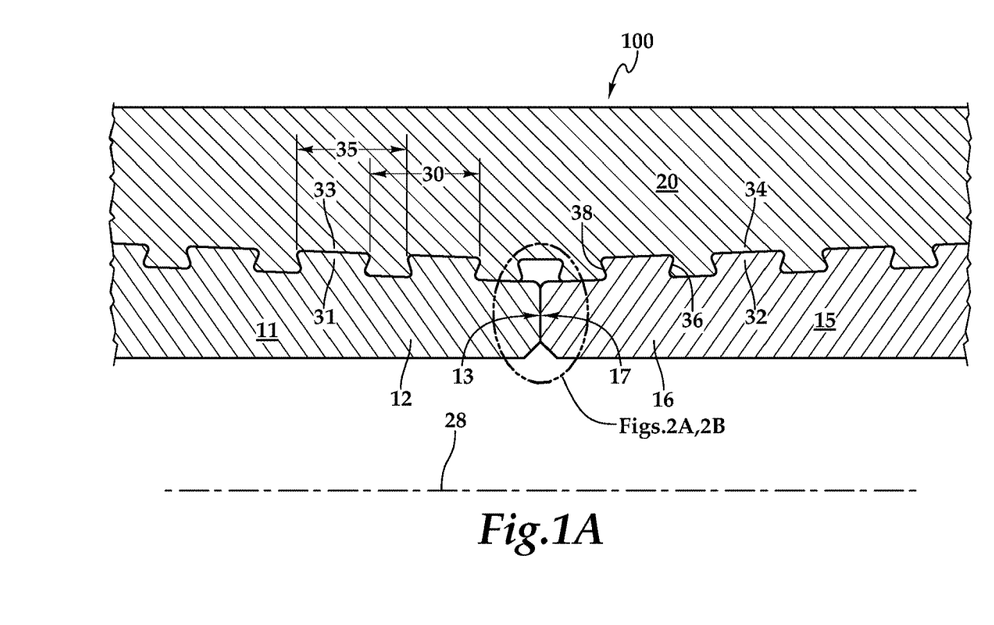
FIG. 1A is an enlarged cross section of a portion of the tubular goods connection of FIG. 1.
Figure 1B:
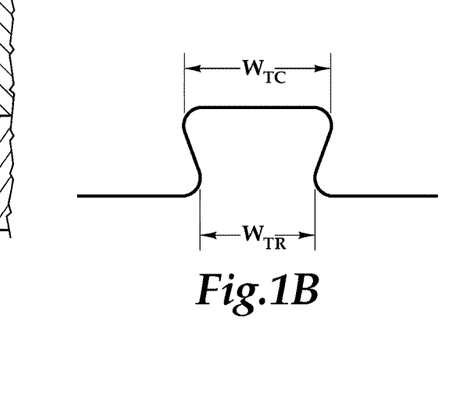
FIG. 1B is an enlarged cross section of a portion of FIG. 1A illustrating the width of a crest, $W_{TC}$, in a dovetail wedge thread and the width of a root, $W_{TR}$, in a dovetail wedge thread of the tubular goods connection of FIG. 1.

Referring now to FIGS. 1 and 1A, the present invention is directed to a made-up tubular goods connection 100 in which a first tubular member 11 has a first distal pin end 18 and a first proximal pin end 12, and a second tubular member 15 has a second distal pin end 19 and a second proximal pin end 16, that are connected one to another by means of a tubular box member ("coupling") 20 having a first box end 22 with a first box end face 23 and a second box end 24 with a second box end face 25. The coupling 20 includes a first internal wedge thread 33 and a second internal wedge thread 34. The first tubular member includes a first mating external wedge thread 31 and the second tubular member includes a second mating external wedge thread 32.

As used herein, "make-up" or in the past tense "being made up" refers to the procedure of inserting into and engaging the first proximal pin end 12 of a first tubular member 11 and the second proximal pin end 16 of second tubular member 15 with the coupling 20 and screwing the members together through torque and rotation to obtain a "made-up connection" 100. Further, the term "selected make-up" refers to the screwing of a pin member and a coupling together with a desired amount of torque or based on a relative position (axial or circumferential) of the pin member with respect to the coupling to obtain a "made-up connection" 100.

Furthermore, the term "box end face" 23, 25 is understood to be the end of the box member facing outward from the box threads and the term "first proximal pin end face" 13 is understood to be the outward facing terminal end of the pin end member 12, and the term "second proximal pin end face" 17 is understood to be the outward facing terminal end of the pin end member 16. As such, upon make-up of a connection, the first proximal pin end face 13 is inserted ("stabbed") past the first box end face 23 and the second proximal end face 17 is inserted (stabbed) past the second box end face 25 into a longitudinal coupling bore 29 through the coupling 20.

Referring to the geometry of threads as illustrated in FIG. 1A, the term "load flank" 36 designates the side wall surface of a thread that faces away from the outer end of the respective pin or coupling member on which the thread is formed and supports the weight (i.e., tensile load) of the lower tubular member hanging in the wellbore. Similarly, the term "stab flank" 38 designates the side wall surface of the thread that faces toward the outer end of the respective pin or coupling member and supports forces compressing the joints toward each other such as the weight of the upper tubular member during the initial make-up of the joint or such as a force applied to push a lower tubular member against the bottom of a bore hole (i.e., compressive force).

Figure 3A:
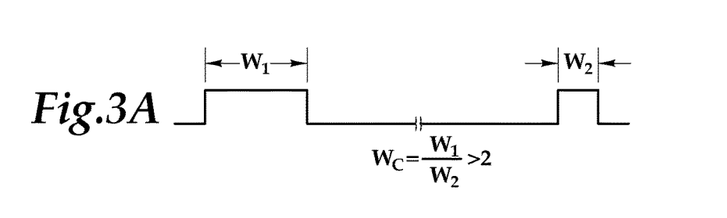
FIG. 3A is a schematic illustrating a thread with high wedge ratio $W_R$ and a high wedge coefficient $W_C$.
Figures 3B, 4:
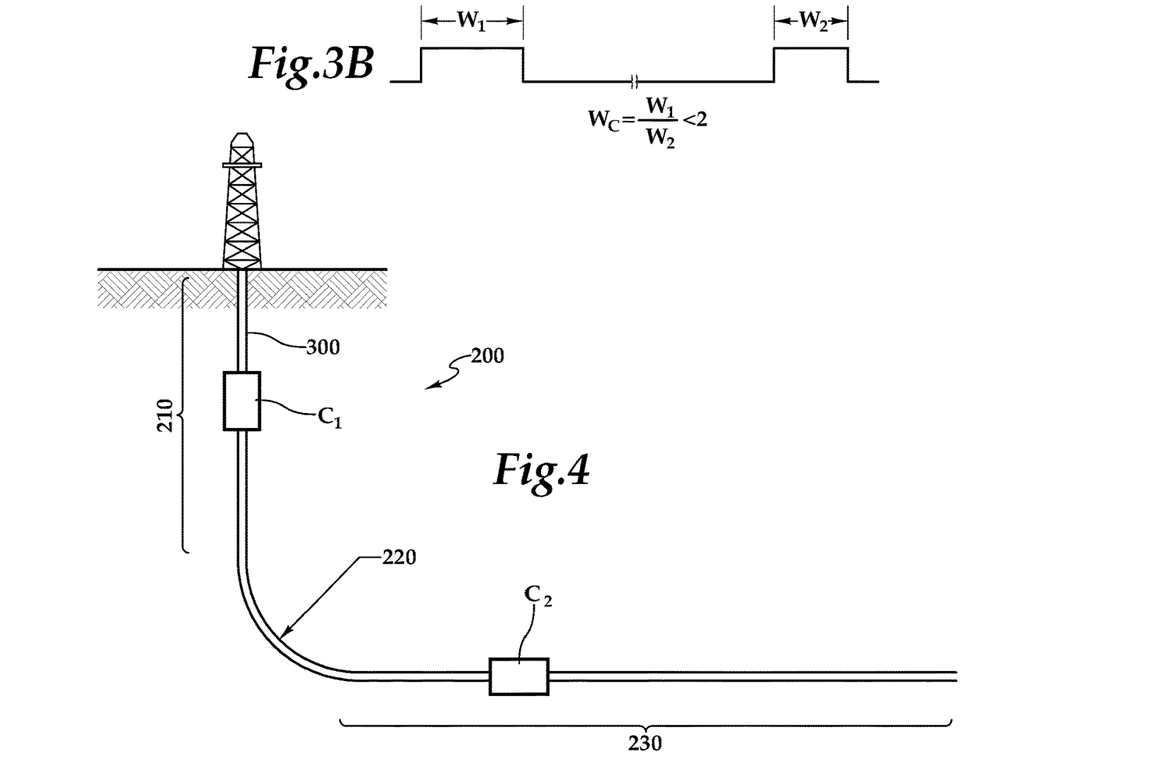
FIG. 3B is a schematic illustrating a thread with a low wedge ratio $W_R$ and a low wedge coefficient $W_C$.
FIG. 4 is a schematic illustrating a deviated wellbore having a vertical and horizontal portion of the wellbore with a string comprised of a plurality of interconnected made-up tubular goods connections of FIG. 1 inserted into the wellbore.

One type of threaded connection commonly used is a wedge thread. Referring to FIGS. 1A, 1B, 3A and 3B, "wedge threads", regardless of a particular type, increase in width $W_1$, $W_2$ in opposite directions on a pin member and a box member. Referring to FIG. 1, the rate at which the threads change in width $W_1$, $W_2$ along the connection is defined by a variable commonly known as a wedge ratio, $W_R$. As used herein, wedge ratio, $W_R$, although technically not a ratio, refers to the difference between the stab flank lead and the load flank lead, which causes the threads to vary width along the connection. Referring to the wedge threads of FIGS. 3A and 3B, different wedge ratios $W_R$ will produce different wedge coefficients $W_C$ ($W_C$ is defined as the ratio $W_1/W_2$ wherein the widest thread width is $W_1$ and the narrowest thread width is $W_2$). FIG. 3A illustrates a high wedge coefficient $W_C=W_1/W_2$. Generally, a thread with a high $W_C$ has a high $W_R$ and a thread with high $W_R$ has a high $W_C$. FIG. 3B illustrates a low wedge coefficient $W_C=W_1/W_2$. Generally, a thread with a low $W_C$ has a low $W_R$ and a thread with a low $W_R$ has a low $W_C$. Wedge threads are extensively disclosed in U.S. Pat. No. RE 30,647 issued to Blose, U.S. Pat. No. RE 34,467 issued to Reeves, U.S. Pat. No. 4,703,954 issued to Ortloff, and U.S. Pat. No. 5,454,605 issued to Mott and each is incorporated herein by reference in their entirety.

Dovetail thread profile: (See FIG. 1B) A wedge thread shape characterized by having a width of a tooth crest $W_{TC}$ wider than a width of a teeth $W_{TR}$, so it can also be said that both flanks, stab and load flanks, are negative.

Vanishing threads: The portion at the end of the threaded portion in a threaded connection, in which threads are not cut full depth, but which provides a transition between full formed threads and pipe body. Theoretically, the vanishing point is the point in which the tapered pitch diameter of the thread intersects the outside pipe diameter ("OD").

Additionally, referring back to FIGS. 1 and 1A, as used herein, a thread "lead" refers to the differential distance between components of a thread on consecutive threads. As such, the "stab lead" 30 is the distance between stab flanks of consecutive thread pitches along the axial length of the connection. A "load lead" 35 is the distance between load flanks of consecutive thread pitches along the axial length of the connection. A detailed discussion of wedge ratios is provided in U.S. Pat. No. 6,206,436 issued to Mallis and is incorporated herein by reference in its entirety.

Wedge threads typically do not have torque shoulders, so their make-up is "indeterminate," and, as a result, the relative position of the pin member and box member may vary more during make-up for a given torque range to be applied than for connections having a positive-stop torque shoulder.

Depending on the type of the wedge thread (interference type or clearance type), the wedging between flanks will be generated in different ways. The wedging effect generated on interference wedge threads is due to specific axial interference fit between mating load and stab flanks. Moreover, the wedging effect can also be achieved without this specific design interference (e.g. clearance wedge type) by, for example, thread drunkenness and/or radial interference.

Regardless of the type of the wedge thread, e.g. clearance wedge, or interference wedge (explained below), corresponding flanks come closer to each other (i.e., clearance decreases or interference increases) during make-up. Indeterminate make-up allows for the flank interference to be increased by increasing the make-up torque on the connection. This increased make up torque will produce some drawbacks because said increased make up torque will generate a higher general stress state due to the higher flank to flank interference that will lead to high contact pressures between sliding elements (during make-up), and also between assembly elements (e.g., at the end of make-up).

Depending on the type of the wedge thread, the wedging between flanks will be generated in different ways. The wedging effect generated on interference wedge threads is due to specific interference fit between at least part of mating load and stab flanks of at least part of the threaded portion. Moreover, the wedging effect can also be achieved without this specific interference (e.g. clearance wedge) by "thread drunkenness" (see below).

As used herein in this patent application, D=0 is meant to express the concept that the pin end faces 13 and 17 are in contact (physically touching), however, there is no axial interference (axial load) transmitted via the contact between the pin end faces 13 and 17.

As used herein in this patent application, D<0 is meant to express the concept of an interference contact between the pin end faces 13 and 17 created by the over torque such that there is axial interference and an axial load is transmitted via the contact between the pin end faces 13 and 17.

Thread drunkenness: Generally, a thread is cut on a tubular element using a substantially constant thread lead (including the load lead and the stab lead); however, some variance in the thread lead occurs during the manufacturing process, which typically includes machining with a mill or lathe. During machining, the variance in the thread lead manifests as a slight periodic variation in the thread lead above and below the intended value for the thread lead. This phenomenon is sometimes referred to as "thread drunkenness." The amount of thread drunkenness that occurs is largely dependent on the machine being used. It may be caused by slop (play) or backlash in the machine tool that is cutting the thread. The material being machined and the dimensions of the part being machined are also variables that affect the amount of thread drunkenness. Thread drunkenness can also occur as a result of the electronic controls "hunting" the location for the machine tool. Typically, thread drunkenness is on the order of 0.00005 inch to 0.0005 inch from nominal and is not visible to the eye. The period of the thread drunkenness is typically at least once per thread turn. Greater than normal thread drunkenness is visible as "chatter" on the thread surface and may result in the connection being scrapped. Generally, manufacturers try to eliminate variations from nominal design, such as experienced with thread drunkenness, but with present technology variations from nominal design cannot be completely eliminated.

Figure 2A:
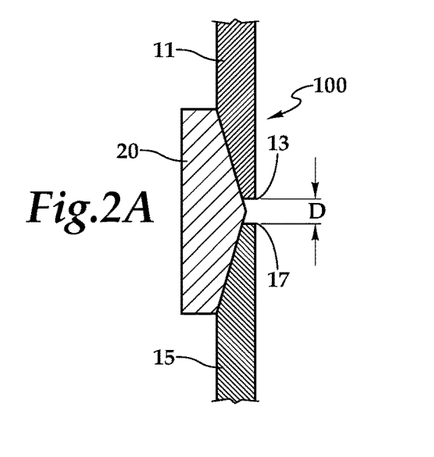
FIG. 2A is a schematic illustrating a gap D>0 between pin ends after the tubular goods connection of FIG. 1 is made up.
Figure 2B:
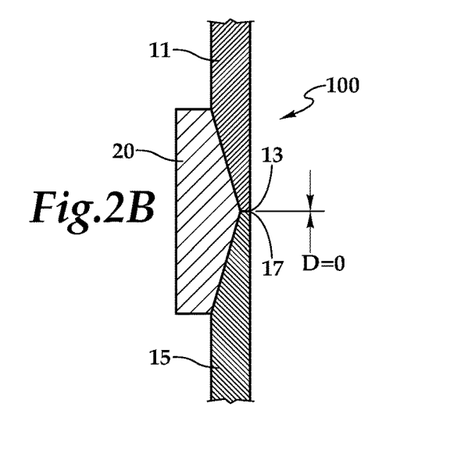
FIG. 2B is a schematic illustrating an interference contact D<0 of the pin ends of the made-up tubular goods connection of FIG. 2A after subsequent additional screwing together of the connection, once the made-up tubular goods connection is in use in the wellbore.

Referring to FIGS. 1, 1A, 2A, 2B, 3A and 3B, the design of the improved tubular goods connection 100 includes the following features:

1. The coupling 20 with no or minimally unthreaded portions (being generally continuously threaded from each box end 22, 24 to proximal to a mid-point 21 of the coupling) and containing internal wedge threads 33 and 34.
2. The first proximal pin end 12 of the tubular member 11 has a continuous first mating external wedge thread 31 that extends from the first pin end face 13 to a vanishing point 37 on a first exterior surface 41 of the first tubular member 11, and a second proximal pin end 16 of the tubular member 15 has a continuous second mating external wedge thread 32 that extends from the second pin end face 17 to a vanishing point 39 on a second exterior surface 45 of the second tubular member 15 and also with substantially no unthreaded portions on the respective pin ends 12 and 16.
3. The wedge coefficient $W_C$, is less than 2, with a target value in the range of 1.3 to 1.9.
4. As illustrated in FIGS. 2A and 2B, at the end of make-up, the distance D between pin end faces 13 and 17 will be between 0 and 10 mm and the pin end faces 13 and 17 are free from axial interference (i.e. Axial interference only occurs when D<0.).

The above features provide the following advantages over the prior art:

1. A strong connection is obtained while controlling the stress and strain in connected pin and box members within acceptable design levels.
2. The "optimum make up torque" is also maintained within operator's acceptable ranges, because most tongs in current common usage in the oil and gas industry are able to reach the make-up levels disclosed within this invention. Optimum make up torque: is the torque value recommended by the manufacturer that is needed to keep connection parts (pin-box) in tighten relation with certain amount of energy to prevent disengagements and to develop desired performances (tensile stress in the pin or compressive stress in the box, See Table 1).
3. These levels of make-up torque also reduce the galling tendency of the connection during make up.
4. The connection has an unusual over-torque capacity without substantially generating additional stresses that can detrimentally affect the capacity of the connection in certain environments, e.g.: corrosion environment+ stresses, that leads to stress corrosion cracking (SCC) effect. Wherein, operative torque or over-torque capacity is the maximum torque to which a connection can be subjected during its operational life (in other words any torque above the maximum optimum torque specified by the manufacturer) and wherein stress corrosion cracking (SCC) is the growth of crack formation in a corrosive environment. It can lead to unexpected sudden failure of normally ductile metals subjected to a tensile stress.
5. The increased over-torque capacity is an important connection criteria needed for operators in certain unconventional applications like drilling and casing wellbores in oil and gas containing shale formations (explained in more detail hereinafter in regard to FIG. 4).

TABLE 1

Optimum Predetermined Make-up Torque Values and Optimum Predetermined Over-torque Values for Threaded Connections

| | |
|---|---|
| Predetermined Optimum Over-torque Capacity: | 150%-250% of Optimum Predetermined Make-up Torque |
| Predetermined Optimum Make-up Torque | 5,000 to 35,000 ft.-lb. |

Exemplary Use

Referring now to FIG. 4 wherein it is an illustrated example of use of made-up tubular goods connection 100 of the present invention in a deviated wellbore 200 (i.e., connection 100 of FIGS. 1, 1A, 2A and 2B). Connections $C_1$ and $C_2$ can be used in the deviated wellbore 200 drilled in oil and gas bearing shale formations. In this kind of deviated wellbore 200, the upper (vertical) portion 210 of the wellbore 200 may be substantially vertical and then there is a transition portion 220 with curvature from the termination of the vertical portion extending to a generally horizontal portion 230. Frequently in order for maximum exposure of the oil and gas producing formation, the horizontal portion 230 of the wellbore 200 is longer than the vertical portion 210 of the wellbore 200.

During running of tubular goods with connections in this kind of deviated well, the make-up torque required for the connection 100 to develop required performance in the well (see for example C1), is reached by means of the optimum predetermined make-up torque defined in Table 1 above. This make-up torque is reached by the wedge thread effect described hereinafter (interference wedge thread or clearance wedge thread).

Figure 5:
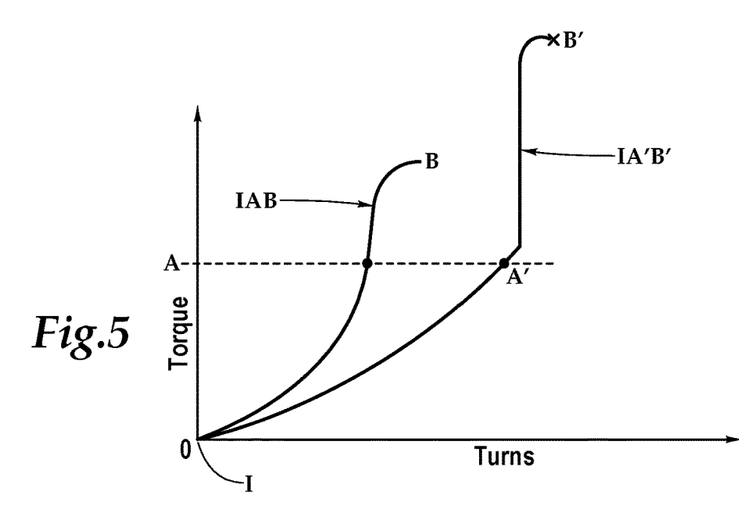
FIG. 5 is a graphical representation of make-up torque versus make-up turns for a prior art connection and for the made-up tubular goods connection of FIG. 1.

A graphical representation that may be referred to as a "torque-turn" curve of the make-up process is illustrated in FIG. 5, in which the turns of the pin into the box are represented on the "x" axis and on the "y" axis the torque obtained is represented. FIG. 5 illustrates different curves obtained for a conventional wedge thread (see curve IA'B') and the connection of the present invention (curve IA'B'). The portions of the respective curves I to A and I to A' represent graphically the evolution torque applied to the connection as a function of the revolutions until a predetermined (e.g. recommended) optimum make-up torque is reached. These kind of curves are obtained during the make-up operation, and usually in the field are used to distinguish a good make-up operation from a bad make-up operation that would need to be repeated. This type of curve provides in real time the turns given by the pin into the box and the torque applied to said pin in order to make it up into the box. For a connection of prior art this is point A and for a connection 100 of the present invention is A'. It will be understood that a slope of the torque—turn curve and the wedge ratio $W_R$, are related, but the slope is not the exact value of the wedge ratio $W_R$. Having a high wedge ratio $W_R$ will lead to a more tapered torque-turn curve (the wedging effect will start quicker than in a connection with lower wedge ratio) that's why the curve portion IA' has a lower slope than curve IA (another way to express this concept is that you need more turns to reach the same value of torque with a lower wedge ratio).

Referring again to FIG. 4, wherein the installing (running) of a tubular goods string 300 (e.g., casing string 300 string 300) with threaded tubular goods connections $C_1$, $C_2$ in wellbore 200 drilled into oil and gas bearing formations is illustrated. In order to position the tubular goods string 300 in the wellbore 200, the string containing multiple connections is lowered through the vertical portion 210 and transition portion 220 of the wellbore 200 and then forced to go into the horizontal portion 230 of the wellbore 200. When running the string 300 into the horizontal portion 230 of the wellbore 200 it is necessary to rotate the entire made-up string 300 to keep it from getting stuck while displacing the made-up string 300 into the horizontal section 230. This rotation imparted due to standard tubular goods (e.g. casing) running procedures for deviated wells, generates an additional torque on at least one or more of the previously made-up tubular goods connection 100 of the string 300 and results in further screwing of the at least one or more of the made-up tubular goods connections. This further additional rotation in the previously made-up tubular goods connection creates torque in the made-up tubular goods connection 100 (e.g. $C_2$) that should be under the over-torque capacity of the made-up tubular goods connection 100 (See Table 1). In other words, the made-up tubular goods connection 100 must be capable of taking that additional rotation (torque) without yielding (inadmissible plastic deformations due to high stresses) nor substantially increasing hoop stresses in the outermost surface of the coupling 20 which can accelerate SCC failures.

As illustrated in FIG. 5, standard wedge threads will have lower over-torque capacity than connection 100 (See curve IA'B') according to the present invention. The difference being that the further additional torque applied to the made-up tubular goods connection 100 during rotation of the tubular goods string 300 while running the tubular goods string 300 into the horizontal portion 230 of the wellbore 200 is taken by the pin end face 13 and to pin end face 17 abutment in the present invention (this axial abutment, D<0) of the present invention will withstand high torques without deformation and also without substantially increasing hoop stresses on the engaged connection elements (pin/box) hoop stresses Axial abutment when D<0 will generate mainly axial stresses.

Referring to FIGS. 2A and 2B, the over-torque capacity of connections of the present invention will be "activated" by the additional extra torque induced by the operation of rotating the tubular goods string while running the tubular goods string (e.g. casing string) into the horizontal portion of the wellbore, and will generate first the pin to pin contact and then all the capacity of the two pin ends 12, 16 will be used to generate that extra torque capacity needed. (See portion A'—operative torque curve of FIG. 5).

As illustrated in FIG. 2A, after make-up, as the tubular goods string is run into a vertical portion of a deviated wellbore, the made-up tubular goods connection 100 has a specified range of values of a distance D between proximal pin end faces 13 and 17 between 10 mm and 0 (contact.) As illustrated in FIG. 2B, after subsequent rotation of the tubular goods string in the wellbore during the running of the tubular goods string into a horizontal portion 230 of the deviated wellbore 200 the secondary torque imposed on the previously made-up tubular goods connection 100 further screws the made-up tubular goods connection 100 together reducing the distance between pin ends when D>than 0 to D=0 and activates the pin to pin abutment to generate an interference contact when D<0. Alternatively, if at initial make-up the distance D=0 (contact) the further screwing results in an interference contact wherein D<0.

Figure 6:
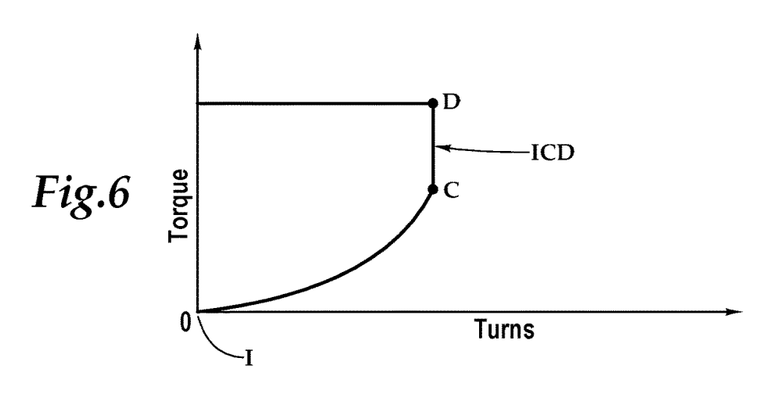
FIG. 6 is a graphical representation of final make-up torque versus final make-up turns for the connection of FIG. 1 with pin end to pin end contact.
Figure 7:
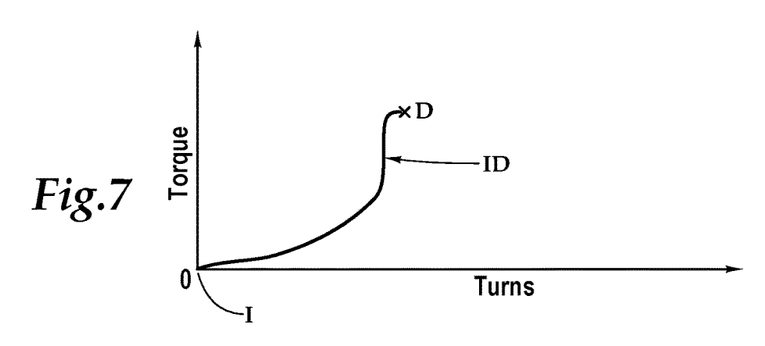
FIG. 7 is a graphical representation of final make-up torque versus final make-up turns for the connection of FIG. 1 with no pin end to pin end contact.

If the value of D at the end of make-up is less than 0 (this means premature interference contact between pin ends 12, 16), the premature contact will consume part of the over-torque capacity produced by the pin to pin abutment in reaching the optimum torque thus reducing the over-torque capacity of the made-up tubular goods connection leading to a less torque-performing connection, (See curve ICD of FIG. 6) Point C is the point when the two pin ends 12, 16 contact each other and D=0. Alternatively, if the gap D is too large the made-up tubular goods connection 100 will not assure that pin end face 13 to pin end face 17 make contact during operation and so the over-torque capacity will be reduced because all the over-torque will only be taken by the wedging effect of the connection (as in prior art) developing higher axial stresses on the threads due to the axial interference and hoop stresses in case of further rotation beyond the optimum torque. (See curve ID of FIG. 7)

Briefly summarizing, the particular design configuration of the made-up tubular goods connection 100 of the present invention provides a connection that can functionally use the wedge thread to generate the optimum make-up torque, while the over-torque capacity (over-torque applied during use over the optimum torque) is taken if needed due to specific operations (e.g., deviated wellbores and/or shale formation applications) by the pin to pin abutment that is "activated" by the operational over-torque applied to the string as the string is forced into the wellbore. This axial abutment in the over-torque mode when D<0 will mainly generate axial stresses, but does not substantially increase hoop stresses.

When used in deviated wellbores, prior art wedge threads like those taught in Blose or Reeves, having higher wedge coefficients (2 or 4), generate torque values that in some cases can generate a general stress state in the connection, in particular high hoop stresses on the outer surface of the coupling 20 (near or above base material yield strength). In order to reduce this effect, the made-up tubular goods connection 100 of the present invention reduces the wedge ratio $W_R$ and thereby the wedge coefficient $W_C$<2 in order to generate lower stresses. This effect is then compensated in the present design (in order to reach acceptable operational torques) by the pin to pin abutment that generates axial stresses that do not affect the outermost coupling surface. Additionally, prior art wedge threads have some drawbacks in terms of galling for high wedge coefficients, so reducing the $W_C$ values in the present design will reduce galling in the connection 100.

Finally, hoop stresses in the outermost part of the coupling 20 of made-up tubular goods connection 100 are reduced (since the general stress state of the made-up tubular goods connection is reduced), and so the stress corrosion cracking (SCC) performance of the connection is enhanced.

What is claimed is:

1. A made-up tubular goods connection for releasably coupling first and second tubular members, said connection comprising:
    a coupling including:
        a first box end having a first box end face and a second box end having a second box end face;
        a longitudinal coupling bore extending through the coupling from the first box end to the second box end;
        a continuous first internal wedge thread formed within the longitudinal coupling bore of the coupling and extending from the first box end face to a mid-point of the longitudinal coupling bore and a continuous second internal wedge thread formed within the longitudinal coupling bore and extending from the second box end face to the mid-point of the longitudinal bore;
    a first tubular member including:
        a first distal pin end and a first proximal pin end;
        a first longitudinal member bore extending through the first tubular member from the first proximal pin end to the first distal pin end, said first proximal pin end terminating in a first proximal pin end face;
        a continuous first mating external wedge thread formed on a first exterior surface of the first tubular member and extending from the first proximal pin end face to a predetermined first point on the first tubular member;
    a second tubular member including:
        a second distal pin end and a second proximal pin end;
        a second longitudinal member bore extending through the second tubular member from the second proximal pin end to the second distal pin end, said second proximal pin end terminating in a second proximal pin end face;
        a continuous second mating external wedge thread formed on a second exterior surface of the second tubular member and extending from the second proximal pin end face to a predetermined second point on the second tubular member; and
    wherein, when the first proximal pin end of the first tubular member has been made-up in the first box end of the coupling prior to installation of the made-up tubular goods connection in a wellbore and the second proximal pin end of the second tubular member has been made up in the second box end of the coupling prior to installation of the made-up tubular goods connection in a wellbore, each made-up having been done with a recommended optimum make-up torque, a member distance D between the first proximal pin end face and the second proximal pin end face is in a range of 0 to 10 millimeters, and wherein when the distance D is equal to 0 millimeters there is contact between the first proximal pin end face and the second proximal pin end face but there is no axial interference prior to installation of the made-up tubular goods connection in a wellbore.

2. The made-up tubular goods connection according to claim 1, wherein a wedge coefficient $W_C$ of the continuous first internal wedge thread, the continuous second internal wedge thread, the continuous first mating external wedge thread, and the continuous second mating external wedge thread is less than 2.0, and wherein $W_C$ is defined as a ratio of a first width ($W_1$) of a widest wedge thread divided by a second width ($W_2$) of a narrowest wedge thread.

3. The made-up tubular goods connection according to claim 2, wherein the wedge coefficient $W_C$ is in a range 1.3-1.9.

4. The made-up tubular goods connection of claim 1, wherein the made-up tubular goods connection is configured such that when an over-torque is applied to the made-up tubular goods connection during installation of the made-up tubular goods connection in a wellbore by rotation of a string comprised of a plurality of interconnected tubular goods connections, said over-torque results in an interference contact between the first proximal pin end face and the second proximal pin end face of the made-up tubular goods connection.

5. The made-up tubular goods connection according to claim 4, wherein the interference contact between the first proximal pin end face and the second proximal pin end face transmits axial load through the made-up tubular goods connection.

6. The made-up tubular goods connection of claim 4, wherein the made-up tubular goods connection has an over-torque capacity in a range of 150%-250% of the optimum make-up torque.

7. The made-up tubular goods connection of claim 1, wherein the continuous first and continuous second internal wedge thread disposed in the coupling, the continuous first mating external wedge thread disposed on the first tubular member, and the continuous second mating external wedge thread disposed on the second tubular member are a dovetail wedge thread.

8. The made-up tubular goods connection of claim 1, wherein the continuous first mating external wedge thread disposed on the first tubular member and the continuous second mating external wedge thread disposed on the second tubular member are a vanishing wedge thread.

9. The made-up tubular goods connection according to claim 8, wherein the predetermined first point on the first tubular member is defined by a first vanishing point of the continuous first mating external wedge thread on the first exterior surface of the first tubular member, and the predetermined second point on the second tubular member is defined by a second vanishing point of the continuous second mating external wedge thread on the second exterior surface of the second tubular member.

10. The made-up tubular goods connection according to claim 9, wherein a first taper pitch diameter of the continuous first mating external wedge thread intersects a first outer diameter (OD) of the first tubular member at the first vanishing point, and a second taper pitch diameter of the continuous second mating external wedge thread intersects a second outer diameter (OD) of the second tubular member at the second vanishing point.

11. The made-up tubular goods connection of claim 1, wherein the continuous first mating external wedge thread of the first tubular member has been made up in the continuous first internal wedge thread of the coupling, and the continuous second mating external wedge thread of the second tubular member has been made up in the continuous second internal wedge thread of the coupling.

12. The made-up tubular goods connection according to claim 1, wherein the recommended optimum make-up torque in the made-up tubular goods connection is created only by the continuous first mating external wedge thread interfering with the continuous first internal wedge thread and the continuous second mating external wedge thread interfering with the continuous second internal wedge thread.

13. The made-up tubular goods connection of claim 1, wherein the tubular goods connection is free from any torque shoulders.

14. The made-up tubular goods connection of claim 1, wherein the predetermined first point of the continuous first mating external wedge thread is located on the first tubular member between the first distal pin end and the first proximal pin end face, and the predetermined second point of the continuous second mating external wedge thread is located on the second tubular member between the second distal pin end and the second proximal pin end face.

15. The made-up tubular goods connection of claim 1, wherein, when the first proximal pin end of the first tubular member has been made-up in the first box end of the coupling and the second proximal pin end of the second tubular member has been made up in the second box end of the coupling, each made-up having been done with the recommended optimum make-up torque, the member distance D between the first proximal pin end face and the second proximal pin end face is in the range of 1 to 10 millimeters.

16. A made-up tubular goods connection for releasably coupling of first and second tubular members, said connection comprising:
   a coupling including:
      a first box end having a first box end face and a second box end having a second box end face;
      a longitudinal coupling bore extending through the coupling from the first box end to the second box end;
      a continuous first internal wedge thread formed within the longitudinal coupling bore of the coupling and extending from a predetermined first beginning point proximal to the first box end face to a predetermined first termination point proximal to a mid-point of the longitudinal coupling bore and a continuous second internal wedge thread formed within the longitudinal coupling bore and extending from a predetermined second beginning point proximal to the second box end face to a predetermined second termination point proximal to the mid-point of the longitudinal coupling bore;
   a first tubular member including:
      a first distal pin end and a first proximal pin end;
      a first longitudinal bore extending through the first tubular member from the first proximal pin end to the first distal pin end, said first proximal pin end terminating in a first proximal pin end face;
      a continuous first mating external wedge thread formed on a first exterior surface of the first tubular member and extending from the first proximal pin end face to a predetermined first point on the first tubular member;
   a second tubular member including:
      a second distal pin end and a second proximal pin end;
      a second longitudinal bore extending through the second tubular member from the second proximal pin end to the second distal pin end, said second proximal pin end terminating in a second proximal pin end face;
      a continuous second mating external wedge thread formed on a second exterior surface of the second tubular member and extending from the second proximal pin end face to a predetermined second point on the second tubular member; and
   said made-up tubular goods connection being adapted to be initially made-up with the first proximal pin end of the first tubular member being made-up in the first box end of the coupling prior to installation of the made-up tubular goods connection in a wellbore and the second proximal pin end of the second tubular member being made up in the second box end of the coupling prior to installation of the made-up tubular goods connection in a wellbore, each being made up using a predetermined optimum make-up torque, resulting in a distance D inside the longitudinal coupling bore measured between the first proximal pin end face and the second proximal pin end face being in a range of 0 to 10 millimeters, and wherein if the distance D=0, there is a contact between the first proximal pin end face and the second proximal pin end face, but there is no axial load transmitted by said contact prior to installation of the made-up tubular goods connection in a wellbore.

17. The made-up tubular goods connection of claim 16, wherein a wedge coefficient $W_C$ of the continuous first internal wedge thread, the continuous second internal wedge thread, the continuous first mating external wedge thread, and the continuous second mating external wedge thread is less than 2.0, and wherein $W_C$ is defined as a ratio of a first width ($W_1$) of a widest wedge thread of the connection divided by a second width ($W_2$) of a narrowest wedge thread.

18. The made-up tubular goods connection of claim 17, wherein a wedge coefficient of $W_C$ is in a range 1.3-1.9.

19. The made-up tubular goods connection of claim 16, being further adapted such that when an over-torque is applied to the made-up tubular goods connection during installation of the made-up tubular goods connection in a wellbore by rotation of a string comprised of a plurality of interconnected made-up tubular goods connections, over-torque results in an interference contact between the first proximal pin end face and the second proximal pin end face of the tubular goods connection.

20. The made-up tubular goods connection of claim 19, wherein the interference contact between the first proximal pin end face and the second proximal pin end face transmits axial load through the made-up tubular goods connection.

21. The made-up tubular goods connection of claim 19, wherein the made-up tubular goods connection has an over-torque capacity in a range of 150%-250% of the predetermined optimum make-up torque.

22. The made-up tubular goods connection of claim 16, wherein the continuous first and continuous second internal wedge thread disposed in the coupling, the continuous first mating external wedge thread disposed on the first tubular member, and the continuous second mating external wedge thread disposed on the second tubular member are a dovetail wedge thread.

23. The made-up tubular goods connection of claim 16, wherein the continuous first mating external wedge thread disposed on the first tubular member and the continuous second mating external wedge thread disposed on the second tubular member are a vanishing wedge thread.

24. The made-up tubular goods connection according to claim 23, wherein the predetermined first point on the first tubular member is defined by a first vanishing point of the continuous first mating external wedge thread on the first exterior surface of the first tubular member, and the predetermined second point on the second tubular member is defined by a second vanishing point of the continuous second mating external wedge thread on the second exterior surface of the second tubular member.

25. The made-up tubular goods connection according to claim 24, wherein a first taper pitch diameter of the continuous first mating external wedge thread intersects a first outer diameter (OD) of the first tubular member at the first vanishing point, and a second taper pitch diameter of the continuous second mating external wedge thread intersects a second outer diameter (OD) of the second tubular member at the second vanishing point.

26. The made-up tubular goods connection of claim 16, wherein the continuous first mating external wedge thread of the first tubular member has been made up in the continuous first internal wedge thread of the coupling, and the continuous second mating external wedge thread of the second tubular member has been made up in the continuous second internal wedge thread of the coupling.

27. The made-up tubular goods connection of claim 16, wherein the predetermined optimum make-up torque in the made-up tubular goods connection is created only by the continuous first mating external wedge thread interfering with the continuous first internal wedge thread and the continuous second mating external wedge thread interfering with the continuous second internal wedge thread.

28. The made-up tubular goods connection of claim 16, wherein the made-up tubular goods connection is free from any torque shoulders.

29. The made-up tubular goods connection of claim 16, wherein the predetermined first point of the continuous first mating external wedge thread is located on the first tubular member between the first distal pin end and the first proximal pin end, and the predetermined second point of the continuous second mating external wedge thread is located on the second tubular member between the second distal pin end face and the second proximal pin end face.

30. The made-up tubular goods connection of claim 16, when the first proximal pin end of the first tubular member has been made-up in the first box end of the coupling and the second proximal pin end of the second tubular member has been made up in the second box end of the coupling, each made-up having been done with the predetermined optimum make-up torque, the distance D between the first proximal pin end face and the second proximal pin end face is in the range of 1 to 10 millimeters.

31. A method of releasably connecting tubular goods comprising:
  providing a coupling including:
    a first box end having a first box end face and a second box end having a second box end face;
    a longitudinal coupling bore extending through the coupling from the first box end to the second box end;
    a continuous first internal wedge thread formed within the longitudinal coupling bore of the coupling and extending from a predetermined first beginning point proximal to the first box end face to a predetermined first termination point proximal to a mid-point of the longitudinal coupling bore and a continuous second internal wedge thread formed within the longitudinal coupling bore and extending from a predetermined second beginning point proximal to the second box end face to a predetermined second termination point proximal to the mid-point of the longitudinal coupling bore;
  providing a first tubular member including:
    a first distal pin end and a first proximal pin end;
    a first longitudinal coupling bore extending through the first tubular member from the first proximal pin end to the first distal pin end, said first proximal pin end terminating in a first proximal pin end face;
    a continuous first mating external wedge thread formed on a first exterior surface of the first tubular member and extending from the first proximal pin end face to a predetermined first point on the first tubular member;
  providing a second tubular member including:
    a second distal pin end and a second proximal pin end;
    a second longitudinal coupling bore extending through the second tubular member from the second proximal pin end to the second distal pin end, said second proximal pin end terminating in a second proximal pin end face;
    a continuous second mating external wedge thread formed on a second exterior surface of the second tubular member and extending from the second proximal pin end face to a predetermined second point on the second tubular member; and
  initially making-up the first proximal pin end of the first tubular member in the first box end of the coupling prior to installation of the made-up tubular goods connection in a wellbore and the second proximal pin end of the second tubular member into the second box end of the coupling prior to installation of the made-up tubular goods connection in a wellbore with a predetermined optimum torque, resulting in a distance D inside of the longitudinal coupling bore between the first proximal pin end face and the second proximal pin end face being in a range of 0 to 10 millimeters, and wherein if the distance D=0, there is a contact between the first proximal pin end face and the second proximal pin end face but there is no axial load transferred by said contact prior to installation of the made-up tubular goods connection in a wellbore;
  installing a string comprised of a plurality of interconnected made-up tubular goods connections in a wellbore; and
  rotating the string in the wellbore and thereby applying an over-torque to at least one of the made-up tubular goods connections in the string, said over-torque creating an interference contact between the first proximal pin end face and the second proximal pin end face, wherein D<0.

32. The method of releasably connecting tubular goods of claim 31, wherein applying the over-torque to the at least one made-up tubular goods connection occurs when the at least a portion of said string is disposed in a horizontal portion of said wellbore.

33. The method of releasably connecting tubular goods of claim 31, wherein the interference contact transmits axial load through the at least one made-up tubular goods connection.

* * * * *